Figure 1:
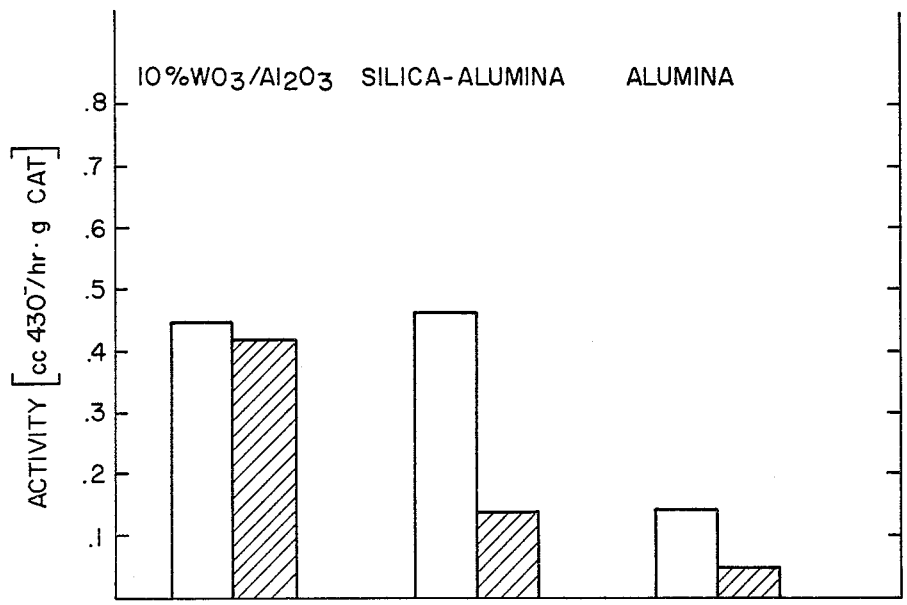

United States Patent [19]

Grenoble et al.

[11] 4,244,811
[45] Jan. 13, 1981

[54] CATALYTIC CRACKING PROCESS WITH SIMULTANEOUS PRODUCTION OF A LOW BTU FUEL GAS AND CATALYST REGENERATION

[75] Inventors: Dane C. Grenoble, Plainfield; Walter Weissman, Berkeley Heights, both of N.J.

[73] Assignee: Exxon Research & Engineering Co., Florham Park, N.J.

[21] Appl. No.: 927,830

[22] Filed: Jul. 25, 1978

[51] Int. Cl.$^3$ ...................... C10G 11/04; C10G 53/14
[52] U.S. Cl. .................................... 208/122; 208/119; 208/120; 208/121; 208/118; 208/123; 252/411 R; 252/419; 252/420; 252/432; 252/456; 252/457; 252/458; 252/461; 252/465; 252/475
[58] Field of Search ................ 208/113, 112, 118–119, 208/123; 252/465–469, 432, 475, 419–420, 411 R; 423/651

[56] References Cited

U.S. PATENT DOCUMENTS

| | | | |
|---|---|---|---|
| 2,124,586 | 7/1938 | Morrell et al. | 208/122 X |
| 2,396,641 | 3/1946 | Connolly | 208/123 |
| 2,513,022 | 6/1950 | Helmers et al. | 423/652 |
| 2,518,775 | 8/1950 | Guyer | 208/78 |
| 2,572,734 | 10/1951 | Kramer | 423/456 |
| 2,849,383 | 8/1958 | Hirschler et al. | 208/119 |
| 3,691,063 | 9/1972 | Kirk | 208/91 |
| 3,985,641 | 10/1976 | Finch et al. | 208/121 |
| 4,098,677 | 7/1978 | Waghorne | 208/113 |

Primary Examiner—Delbert E. Gantz
Assistant Examiner—G. E. Schmitkons
Attorney, Agent, or Firm—J. J. Allocca; Edward M. Corcoran

[57] ABSTRACT

A process is described for the catalytic cracking of a hydrocarbon feedstream involving the use of an acid catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide on supports, wherein (1) the feedstream is catalytically cracked by being contacted with said catalyst at a temperature and for a time (optionally, in combination with $H_2O$), sufficient to crack the hydrocarbon yielding a cracked product and a deactivated catalyst and (2) subjecting the deactivated catalyst to gasification conditions consisting of (A) partial oxidative combustion to produce a low BTU gas rich in CO or, (B) the addition of steam to produce a gas rich in $H_2$, or both, with the recirculation of the decoked catalyst back to the first step.

13 Claims, 3 Drawing Figures

FIGURE I

EFFECT OF STEAMING ON ACTIVITY FOR
CRACKING ETLGO AT I HOUR ON OIL

T = 950°F $P_T \sim 3$ ATM $P_{H_2O} \sim 2.8$ ATM $(WHSV)_{OIL} = 1.4$ HR$^{-1}$

EFFECT OF $WO_3$ CONCENTRATION ON
CAT CRACKING ACTIVITY FOR ETLGO

CATALYTIC CRACKING PROCESS WITH SIMULTANEOUS PRODUCTION OF A LOW BTU FUEL GAS AND CATALYST REGENERATION

DESCRIPTION OF THE INVENTION

A process is described for the catalytic cracking of hydrocarbon feedstreams which comprises (1) contacting a hydrocarbon feedstream with an acid catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide, preferably tungsten or niobium oxides, most preferably tungsten oxides, supported on an inorganic refractory oxide support which support is preferably selected from the group consisting of α-alumina, η-alumina, γ-alumina, silica, zirconia, boria, thoria, magnesia, zirconium-titanate, titania, chromia, kieselguhr and mixtures thereof, preferably the aluminas; which catalyst may further contain an alkaline or alkaline earth oxide promoter if desired, at a temperature, pressure and for a time sufficient to effect the desired catalytic change on the hydrocarbon feedstream and yield a coked catalyst; (2) subjecting the coked catalyst to regenerative conditions selected from the group consisting of (a) oxidative combustion yielding a regenerated catalyst and a low BTU gas rich in CO, and (b) steam gasification resulting in a regenerated catalyst and an $H_2$ rich gas and combination thereof, the regenerated catalyst is then recirculated to the hydrocarbon conversion zone of step 1. Step 1 may optionally include the use of $H_2O$.

BACKGROUND OF THE INVENTION

A typical conventional process for the conversion of heavy hydrocarbon feeds (resid, coal liquid) is fluid coking. Ordinarily the process operates with two fluidized beds, a reactor and a burner. The hydrocarbon feed is injected into the reactor where it is thermally cracked to form vapor phase products and coke. Alternatively, heavy feeds can be catalytically cracked. This process also functions with multiple fluidized beds with catalyst recirculating between a reactor and a regenerator. The feed to be cracked is injected, with the hot, regenerated catalyst into the reactor where the cracking reaction occurs. The hydrocarbon products and the catalyst are separated by steam stripping; the products are sent to a fractionator and the catalyst is transferred to the regenerator. In the regenerator deposited coke is removed by burning in air and the regenerated catalyst is then returned to the reactor. Depending on the catalyst used, regenerator temperatures are between 1200° and 1400° F. (650°–760° C.). There are currently three catalysts commonly in use for catalytic cracking: silica-alumina, zeolite silica-alumina mixtures and silica-magnesia.

To avoid serious catalyst deactivation and excessive coke make, petroleum feeds sent to cat cracking processes are normally restricted to the vacuum gas oil fraction boiling below 1050° F. This is directly related to the large amount of metals in the 1050° F.+ material that contaminates the catalyst and the large amount of Conradson Carbon coke forming precursors in the 1050° F.+ material. Techniques are available to mitigate the effects of deposited metals, e.g. antimony addition, however, the high content of coke precursors in 1050° F.+ materials still make direct processing in cat cracking problematic. At the moment, catalysts which have become deactivated due to coke deposition are regenerated by burning the coke. If unhydrotreated 1050° F.+ was processed in large quantities in cat cracking the amount of coke produced would be greater than the amount that could be burned in the regenerator to sustain the unit in heat balance. The heat produced by burning off the excess coke would likely have to be used in the production of relatively low value steam. This will be accomplished by incorporation of steam boiler tubes in the regenerator bed. Ideally, however, the coke should be converted into valuable products since the coke for a 1050° F.+ material represents about 25% of the total material fed into the cat cracking unit; about three quarters of which is in excess over the amount that would be burned to sustain the unit in heat balance. In order to convert the coke into commercially valuable products it must be gasified, that is, reacted with an oxygen-containing and/or steam-containing gas at temperatures of 1600°–1800° F. (870°–980° C.).

One of the main drawbacks in attempting to utilize this coke gasification in a typical cat cracking process is the extreme sensitivity of the prior art catalyst to high temperatures in the presence of steam. While the coke may indeed be gasified the catalyst is irreversibly deactivated, thereby resulting in a very high debit in operations. Consequently, to avoid destroying the catalyst, the coke is merely burned at low temperatures (<1400° F.) and when this quantity of coke is greater than the amount needed to sustain heat balance, the excess is used to produce steam for the refinery, an equally pernicious result considering that coal could be most readily used in large stationary combustors such as steam boilers. In order to achieve maximum material efficiency and practice, cat cracking of substantial quantities of 1050° F.+ streams, it will be necessary to simultaneously practice both coke gasification and catalyst regeneration. To do this, an exceptionally long lived, active, stable catalyst will be needed.

With the incorporation of gasification, the coke gas produced is mainly a mixture of CO, $CO_2$, $H_2$, $H_2O$, $H_2S$ and $N_2$-if air is employed. The $H_2S$ can be removed by technology such as the Stretford process, thereby a clean $H_2$-CO containing gas might be produced for a wide range of uses—e.g. process furnaces, fuel gas, $H_2$ manufacture, etc. Gasification is therefore a more efficient utilization of this potential coke energy contained in each barrel of feed. For the case where air is used as the gasification medium, the coke gas produced, $\sim 10^4$ SCF/bbl, would have an energy content of $\sim 100$ BTU/SCF.

THE INVENTION

It has been discovered and forms the basis of the disclosure that catalytic cracking processes, followed by simultaneous coke gasification and catalyst regeneration can be successfully practiced by the use, as the catalyst, of a material supported on an inorganic refractory oxide support selected from the group consisting of alumina, silica, zirconia, boria, thoria, magnesia, zirconium-titanate, titania, chromia, kieselguhr and mixtures thereof, preferably the aluminas, i.e. α-alumina, η-alumina, γ-alumina.

The catalysts useful in the instant process are the oxides of tungsten, niobium, and mixtures thereof, and tungsten or niobium oxides in combination with one or more additional metal oxides selected from the group consisting of tantalum oxide, hafnium oxide, chromium oxide, titanium oxide and zirconium oxide, preferably the oxides of tungsten or niobium, most preferably, tungsten oxide on the supports, the most preferred support being the aluminas. The catalyst comprises from 0.1 to 25 wt. % catalytic metal oxide, based on total catalyst weight, preferably 2-10 wt. % catalytic metal oxide based on total catalyst weight, more preferably 2-8 wt. % based on total catalyst weight with the most preferred catalyst weight loading being 4-6 wt. % based on total catalyst weight. When using the mixed oxide systems of tungsten oxide of niobium oxide in combination with one or more of tantalum oxide, chromium oxide, titanium oxide, zirconium oxide and hafnium oxide the ratio of tungsten oxide or niobium oxide to the additional metal oxide is on the order of 1:1, preferably 3:1, most preferably 9:1. These catalysts have been found to be extremely efficient cracking catalysts. It has also been discovered that these catalysts do not deactivate upon sustained exposure to steam at high temperature, i.e. temperatures above ~1500° F. See copending U.S. applications Ser. No. 927,828 and Ser. No. 927,829, filed on the same day herein incorporated by reference.

The instant invention is directed to a process for the efficient conversion of heavy hydrocarbon feedstream (residua or heavy coal liquids) which have large coke makes into high value commercial products involving the steps of:

(a) contacting the heavy hydrocarbon feed with a catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide on an inorganic refractory oxide support, for a time and under conditions sufficient to (1) convert the feed into lower molecular weight hydrocarbon products and (2) deactivate the catalyst by means of coke deposition and (b) transferring the coke deactivated catalyst to a gasifier-regenerator wherein the deactivated catalyst is treated under regenerating-gasifying conditions selected from the group consisting of oxidative combustion to yield regenerated catalyst and low BTU gas rich in CO and/or steam gasification to yield regenerated catalyst and an $H_2$ rich gas.

In the case where partial combustion is employed, small amounts of steam might be added along with the air to absorb a portion of the exothermic heat of reaction. In the case where steam gasification is employed a means for providing the endothermic heat for this gasification must be provided. This can be accomplished by adding oxygen along with the steam or by circulating hot catalyst solids from a third vessel where a portion of the coke on the catalyst is combusted with air. If desired, small amounts of alkali and alkaline earth metal oxides may be added to the catalyst as promoters. The alkali and/or alkaline earth metal oxides which may be added to the catalysts are selected from the group consisting of barium oxide, calcium oxide, strontium oxide, cesium oxide, preferably barium, calcium and strontium oxides. These added oxides can be added simultaneously with the primary catalytic oxide to the refractory oxide support material or they can be added subsequent to the formation of the catalyst. The addition can be accomplished by any technique common to the art, standard incipient wetness technique being preferred. The amount of promoter added, if any is added at all, may range from 0.01 to 4.0 wt.% based on total weight of catalyst.

The hot regenerated catalyst can be recirculated to the reactor, the sensible heat released as these solids cool to the reactor site temperature providing the endothermic heat of cracking. In general, the process is identical to current cat cracking processes with the exception of an option to include steam in the reactor as a catalyst promoter and the operation of the regenerator to produce a gas from the coke having a significant heating value (i.e. >100 BTU/SCF).

In general, the conditions employed for the conversion of the heavy hydrocarbon feedstream into lower molecular weight hydrocarbon products by contacting the heavy feed with the recited catalyst at a temperature ranging from 300° to 900° C., preferably 400° to 600° C., pressure ranging from 0 to 10,000 psig, preferably 50 to 500 psig, contact times ranging from 1 to 2,000 seconds, preferably 5 to 200 seconds at from 0.1 to 50 Weight Feed/Hr/Weight Catalyst (WHW), preferably 1-4 WHW. Optionally, $H_2O$ may be added to the reaction chamber along with the hydrocarbon feedstream. When this is done, the $H_2O$/hydrocarbon mole ratio ranges from 0.5:1 to 20:1, preferably 1:1 to 10:1. To regenerate the catalyst, the typical conditions employed in the regenerator comprise a pressure not greater than 150 lbs. psig, preferably not greater than about 60 psig, more preferably not greater than about 45 psig. The temperature is maintained at a level in the range of about 1400°-2800° F. (760°-1535° C.), preferably at a temperature greater than about 1500° F., more preferably at a temperature in the range of about 1600° to 1900° F., most preferably at a temperature in the range of about 1700° to 1800° F. The coked catalyst is treated under the above conditions in the regenerator in the presence of steam and an oxygen containing gas to produce a hot gaseous steam containing $H_2$ and CO. The conversion of coke into CO and $H_2$ proceeds by the following scheme:

$$(n+1)\ C + (0.5+n)\ O_2 \rightarrow CO + nCO_2 \tag{1}$$

$$CO + O_2/2 \rightarrow CO_2 \tag{2}$$
$$CO_2 + C \rightleftharpoons 2CO \tag{3}$$

$$H_2O + C \rightleftharpoons H_2 + CO \tag{4}$$
$$H_2O + CO \rightleftharpoons CO_2 + H_2 \tag{5}$$

When coke is oxidized, the initial product is a mixture of CO and $CO_2$ as shown in equation (1). At temperatures of 1,600° F.+ in the presence of oxygen, CO is rapidly oxidized to $CO_2$ according to equation (2). After oxygen has been exhausted, $CO_2$ reacts with carbon to form CO. At high temperatures, equilibrium favors drawing equation (3) to the right to form CO. Low pressure also favors this reaction. Reaction (3) is slower than reaction (2). Thus, equilibrium would favor very high CO/$CO_2$ ratios at conditions of 1,700° F.-1750° F.+ and pressures of 2.7 atm or lower in the gasifier.

Steam will also gasify coke as represented by equation (4). This reaction is slightly endothermic and when steam is substituted for some of the oxygen, the gasification zone temperature drops at a constant quantity of coke gasified. Finally, water reacts with CO to produce $CO_2$ and hydrogen in the water gas shift represented by equation (5). Most of the sulfur in the coke will be converted to H₂S with a very small amount of COS being formed.

In order to obtain significant conversion of coke to low BTU gas, it is necessary to gasify at temperatures in the range of 1600°–1800° F. These high temperatures in the presence of the steam normally contained in a regenerator place severe requirements on the stability of cracking catalysts. In order to this type of process to be practical, catalyst systems must demonstrate the ability to withstand these severe conditions. To this end the activity of a variety of $WO_3/Al_2O_3$ catalysts and some conventional catalysts before and after steaming treatments at 1600° F. have been compared.

Before discussing these activity comparisons, the catalyst testing conditions will be described. These conditions are for a fixed bed reactor with catalyst contact times of 1 to 5 hrs. Although these conditions are not typical of conventional cat cracking conditions, they are valuable for intercomparisons of catalysts at relatively long contact periods. The reactor design is described in the section prior to the examples.

The reaction investigated was gas oil cracking to break C—C bonds in the presence of a large excess of steam. The cracking reaction produces a liquid gasoline fraction referred to as the $C_5$-430⁻ fraction or cut. The amount of this gasoline fraction is referred in the below tables as the conversion. The conversion was measued after 1 and 5 hrs. interval. The competing side reactions which are undesirable are gasification and coking. Both side reactions are important in catalytic-cracking because they directly affect the gasoline yields. All the catalysts in the tables below were evaluated at a relatively high space velocity in order to minimize catalyst deactivation by coking. All reactions were for a 25 g catalyst charge with an oil flow rate of 40 cc/hr.

GENERAL DESCRIPTION OF DRAWINGS

The three figures show the effect of steaming.

FIG. 1 shows the effect of steaming on the activity of a 10% $WO_3/Al_2O_3$ catalyst compared to a conventional silica-alumina catalyst and to the pure alumina substrate. The activity is defined as the amount of 430⁻° F. liquid material produced per hour per gram of total catalyst. Note that this represents the activity of the various catalysts to produce a gasoline-type liquid. It is seen from FIG. 1 that the $WO_3$ catalyst is markedly different from the conventional silica-alumina catalyst with regard to its stability towards severe steaming. The silica-alumina catalyst loses a substantial fraction of its activity whereas the $WO_3/Al_2O_3$ catalyst loses almost none of its activity. The alumina base used in the preparation of the $WO_3$ catalyst has a low fresh (unsteamed) activity and loses virtually all its activity after steaming.

Figure 2:
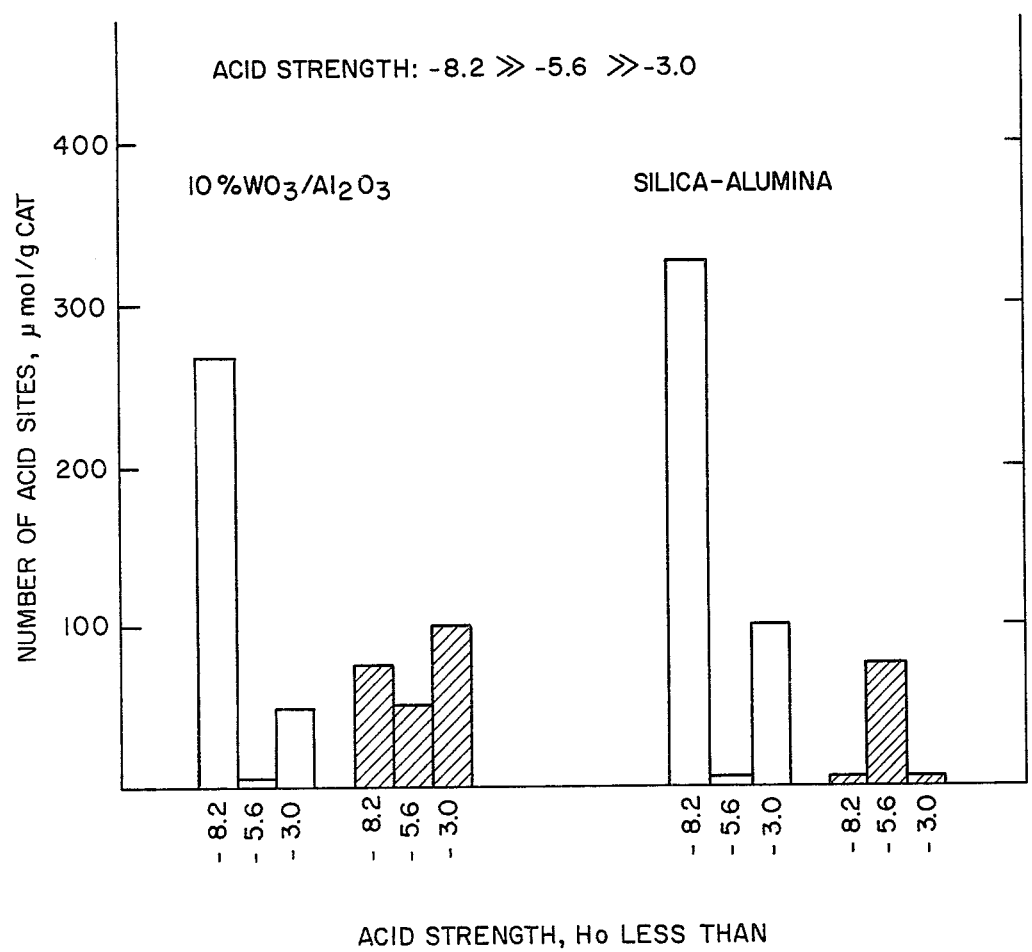

FIG. 2 depicts the effect of steaming on the acid site strength and distribution for the $WO_3/Al_2O_3$ and silica-alumina catalysts. Again it is obvious that there is a substantial difference between $WO_3/Al_2O_3$ catalyst and the silica-alumina catalyst. For the $WO_3/Al_2O_3$ catalyst there are still a significant number of the very strong (−8.2) sites which are the sites believed to be primarily responsible for cat cracking reactions. On the other hand, the silica-alumina catalyst loses all of its strong acid (−8.2) sites. It is clear that steaming has caused a major change in the surface morphology of the silica-alumina catalyst resulting in the complete destruction of surface sites having strong acid character. The $WO_3/Al_2O$ catalyst is apparently not similarly affected thereby indicating a substantial difference in the nature of the strong acid sites on the two catalyst. During steaming the surface area of the $WO_3/Al_2O_3$ catalyst drops from about 180 m²/g to about 60–70 m²/g. The silica-alumina catalyst drops in surface area from 350 m²/g to about 40 m²/g. The activity maintenance and the maintenance of a significant number of high strength acid sites on the $WO_3/Al_2O_3$ system indicate that the $WO_3$ or $WO_3$-$Al_2O_3$ sites remain after steaming in spite of the large loss in surface area of the catalyst. The collapse of surface area for silica-alumina apparently results in a complete destruction of the active catalytic sites.

In summary, the loss in active sites ($\leq -8.2$ Ho Acidity) for the steamed $WO_3$ or $Al_2O_3$ catalyst, FIG. 2, shows that although significant surface area decrease occurs that a third of the strong acid sites are preserved. These strong acid sites which are maintained following steaming treatment, despite being reduced in number of sites per gram of catalyst, are clearly capable of giving nearly fresh catalyst activity, FIG. 1. This is one of the principal discoveries of the catalysts of the present invention and constitute a major advancement over state of the art catalysts.

Figure 3:
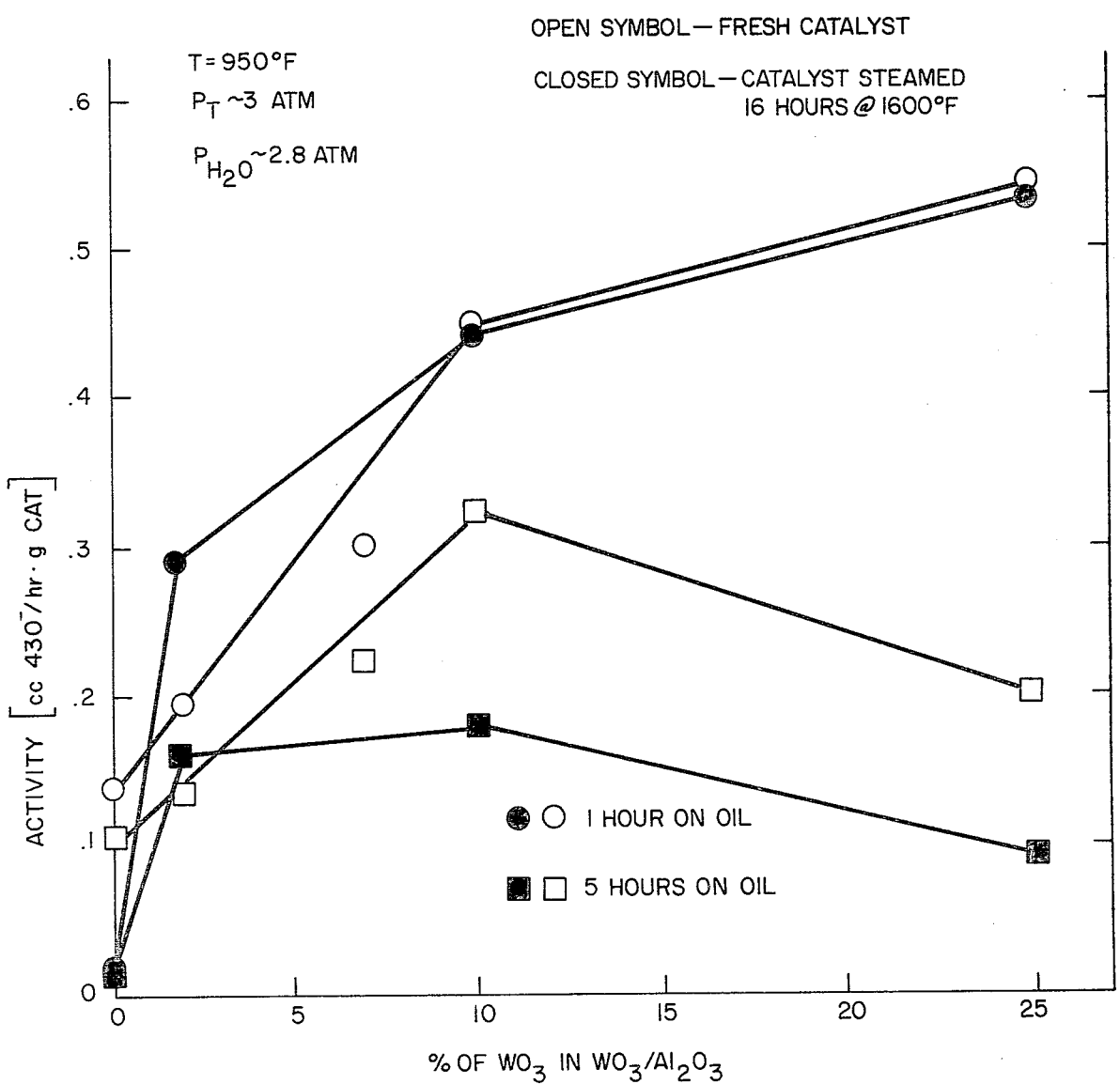

FIG. 3 shows the effect of $WO_3$ concentration on the activity at 1 hour and 5 hours on oil for the $WO_3/Al_2O_3$ catalyst system before and after steaming at 1600° F. for 16 hours. It is clear that increasing $WO_3$ concentration increases conversion at one hour on oil for the fresh catalysts. The difference in activity for fresh catalysts at one hour on oil compared to five hours on oil increases with increasing $WO_3$ concentration, eventually becoming quite large for the 25% $WO_3/Al_2O_3$ catalyst. After steaming similar effects occur but important differences emerge. At the 2% $WO_3$ level steaming actually increases activity. At the 10% and 25% loading levels steaming does not substantially alter activity. The activity maintenance indicates that the $WO_3$ remains completely accessible for catalysts. It should be added that under identical reaction conditions to those used in the above discussed experiments a zeolite catalyst steamed at somewhat less severe conditions than either the $WO_3/Al_2O_3$ or silica-alumina catalysts lost substantial activity after steaming. The activity at one hour on oil as defined in FIG. 1 dropped from 0.74 to 0.24. This again illustrates the inherent steam stability of the $WO_3/Al_2O_3$ system relative to conventional catalyst systems.

For an examination of catalysts under conventional cat cracking reaction conditions a series of catalysts were studied in a unit employing a batch fluidized catalysts bed. Typical catalyst contact times were about two minutes. This unit is similar to Micro Activity Testing (MAT) Units used industry-wide for cracking catalyst evaluation. These tests are particularly relevant to the conceptual scheme of this invention. The information obtained is the activity defined as the amount of feed converted to 430⁻° F. product and the selectivity to $C_5$-430° F. gasoline, $C_1$-$C_4$ gases, hydrogen, 430°–650° F. middle distillate, and coke.

The catalysts tested were a 10% $WO_3/Al_2O_3$ catalyst and a 2% $BaO$/10% $WO_3/Al_2O_3$ catalyst. These catalysts were tested with two different feeds and in the presence and absence of water. In Tables I and IIA a comparison of the $WO_3/Al_2O_3$ catalyst to conventional amorphous silica-alumina and commercial zeolite containing catalyst is made by high-lighting the principal selectivity factors. In general the activity of the 10%

$WO_3/Al_2O_3$ catalyst is comparable to the silica-alumina catalyst.

The results presented in Tables I and II suggest a variety of process opportunities. If it is desirable to minimize coke two options are suggested by the results in Table II. First it can be seen that operating with steam addition to the reactor substantially lowers coke make. Also, as the data in Table IIB indicates, extending the residence time of the catalyst in the bed from 2 min. to 20 min. greatly lowers the amount of coke produced on feed. The data indicates that there is first a large build-up of coke on catalyst followed then by a long period of time with little additional coke make but nearly constant feed conversion. The significance of this is two-fold; one is that by operating with residual coke on catalyst, the initial rapid coking and resultant poor selectivity to hydrocarbon products is mitigated. Secondly, the gasifier/regenerator may be reduced in size as the residence time necessary to gasify a smaller amount of coke would correspondingly be lower. On the other hand, depending on the type of feed used it may be advantageous to maximize the amount of coke converted to low BTU gas or synthesis gas in the gasifier/regenerator. Thus, as the data in Table II show, coke can be maximized by operating the reactor in a steam free environment.

TABLE I

COMPARISION OF $WO_3/Al_2O_3$ TYPE CATALYSTS TO STANDARD CATALYSTS IN MCG EXPERIMENTS

Feed: ETLGO
$T_{cat}$: 950° F.

| Catalyst | $WO_3/Al_2O_3$ | Silica-alumina | Zeolite |
|---|---|---|---|
| Pretreatment | 1400° F. STM | 1400° F. STM | 1400° F. STM |
| Gas Added during Cycle | Steam | None | None |
| Cycle Length, min | 2 | 2 | 2 |
| W/hr/W | 3.06 | 1.96 | 14.6 |
| Conversion, Wt % | 55.0 | 60.0 | 60.0 |
| Carbon, Wt % | 7.3 | 4.3 | 0.8 |
| $C_3^-$, Wt % | 10.4 | 12.9 | 5.1 |
| Tot. $C_4$, Wt % | 10.4 | 14.0 | 7.7 |
| $C_5$/430° F., Wt % | 26.9 | 28.7 | 46.4 |
| $C_3H_6$, SCF/B | 192 | 199 | 125 |
| $H_2$, SCF/B | 238 | 68 | 16 |

TABLE II

A. WITH ETLGO (500-700° F.) FEED

| Catalyst | 10% $WO_3/Al_2O_3$ | | 2% BaO/ 10% $WO_3/Al_2O_3$ | | 10% $WO_3/Al_2O_3$ | 2% BaO/ 10% $WO_3/Al_2O_3$ | Zeolite |
|---|---|---|---|---|---|---|---|
| Pretreatment | Htd. @ 1000° F. | | | | Stmd. @ 1400° F. | | |
| Gas Added During Cycle | Stm. | $N_2$ | Stm. | $N_2$ | Stm. | Stm. | None |
| W/Hr./W | 2.90 | 2.91 | 2.76 | 2.77 | 3.06 | 2.83 | 14.6 |
| Conversion, Wt. % | 56.5 | 70.8 | 38.3 | 58.7 | 55.0 | 38.8 | 60 |
| Carbon, Wt. % | 15.0 | 22.4 | 13.8 | 16.3 | 7.3 | 11.0 | 0.8 |
| $C_3^-$ Gas, Wt. % | 8.1 | 12.6 | 3.1 | 7.7 | 10.4 | 4.1 | 5.1 |
| Tot. $C_4$, Wt. % | 8.1 | 11.6 | 3.1 | 7.6 | 10.4 | 4.1 | 7.7 |
| $C_5$/430° F., Wt. % | 25.3 | 24.3 | 18.3 | 27.1 | 26.9 | 19.5 | 46.4 |
| $C_3H_6$, SCF/B | 146 | 178 | 50 | 116 | 192 | 75 | 125 |
| $H_2$, SCF/B | 204 | 655 | 76 | 288 | 238 | 73 | 16 |

B. HEAVY GAS OIL

| Catalyst | 10% $WO_3/Al_2O_3$ | 2% BaO/ 10% $WO_3/Al_2O_3$ | 2% BaO/10% $WO_3/Al_2O_3$ | | |
|---|---|---|---|---|---|
| Pretreat | Stmd @ 1400° F. | | | | |
| Gas Added | Steam during process period | | | | |
| Cycle Length, Min. | 2 | 2 | 2 | 16 | 20 |
| W/Hr./W | 3.15 | 3.05 | 2.94 | 2.94 | 2.94 |
| Conversion, Wt. % | 67.7 | 60.3 | 56.0 | 48.6 | 47.3 |
| Carbon, Wt. % | 9.6 | 12.8 | 3.9* | 3.9* | 3.9* |
| $C_3^-$ Gas Wt. % | 13.0 | 7.5 | 7.7 | 9.1 | 6.8 |
| Tot. $C_4$, Wt. % | 12.3 | 6.9 | 6.8 | 4.6 | 3.0 |
| $C_5$/430° F., Wt. % | 32.8 | 33.1 | 37.7 | 31.0 | 33.6 |
| $C_3H_6$, SCF/B | 263 | 159 | 151 | 147 | 101 |
| $H_2$, SCF/B | 270 | 90 | 141 | 155 | 132 |

*Average for total 20 minute cycle based on carbon analysis as measured on catalyst discharged at end of experiment.

The following are a series of examples directed to the catalytic use of the disclosed metal oxides on supports and are presented so as to demonstrate the general applicability of the instant inventive process with the disclosed catalysts.

The reaction investigated was gas oil cracking to break C—C bonds in the presence of a large excess of steam. The cracking reaction produces a liquid gasoline fraction referred to as the $C_5$-430— fraction or cut. The amount of this gasoline fraction is referred in the below tables as the conversion. The conversion was measured after a 0.5 and a 1 hr. interval. The competing side reactions which are undesirable are gasification and coking. Both side reactions are important in catalytic-cracking because they directly affect the gasoline yields. All the catalysts in the tables below were evaluated at a relatively high space velocity in order to minimize catalyst deactivation by coking. All reactions were for a 12.5 g catalyst charge with an oil flow rate of 80 cc/hr.

In the following examples a series of the disclosed metal oxides supported on alumina are compared for catalytic activity. The activity measurements were obtained in a typical downflow gas phase reactor having a total catalyst capacity of 40 cc. Liquid oil is fed to the reactor by a dual barrel Ruska pump. Water is fed simultaneously to the oil by a Lapp pump. The reactor is maintained at reaction temperature by immersion in a heated fluidized sandbath. Operating conditions are as follows: Oil Feed: East Texas Light Gas Oil,
  Boiling Range 450°–700° F.
  Catalyst Temp: 510° C.
  Pressure: 30 PSIG°
  (WHSV)+ Oil: 5.6
  H$_2$O:Oil Molar Ratio: 10
+ Weight hourly space velocity Activities are expressed as the amount of oil feed converted to liquid product boiling 430° F., i.e. this is referred to as 430−° F. product. The activity is thus defined by the following expression:

Activity=Conversion to 430—° F. Liquid×Flow Rate of Oil×(Cat Weight)−1

Prior to activity measurement, the catalyst was brought to reaction temperature and water added for ½ hour prior to addition of oil feed. This is necessary to prevent premature coking of the catalyst surface.

The thermal stability of the catalyst described in the current invention were determined by subjecting the various catalysts to a high temperature calcination in moist air. The conditions used to determine stability were air calcination at 900° C. with air sparged through a water saturator. The steaming treatment was carried out at ambient pressure.

EXAMPLE 1

An alumina of high purity (reforming grade, Engelhard Industries) was evaluated for acid cat cracking activity under the conditions described previously after a one-half hour period and a one hour period on oil. The Al$_2$O$_3$ catalyst had an activity of 0.005 and 0.01 cc, 430−°F. liquid produced/hour/g catalyst, respectively. The total gas production after one hour was 0.4 liter. The coke on catalyst was 1.6 and 0.7 wt. % for the top and the bottom of the catalyst bed, respectively. This example is for comparison to other catalysts of the instant invention. See Table III A.

EXAMPLE 2

A 3.6 wt. % TiO$_2$ on Al$_2$O$_3$ catalyst (containing 450 μm/g of Ti) was prepared using a methanol solution of TiCl$_4$ sufficient to fill the pore volume of the alumina described in Example 1. Following drying of the catalyst under vacuum to remove methanol the catalyst was dried at 110° C. overnight. The catalyst was then calcined at 500° C. overnight in a muffle furnace. The cat cracking activity was obtained as described previously. The 3.6% TiO$_2$ on Al$_2$O$_3$ catalyst had an activity of 0.04 and 0.03 cc 430−°F. liquid produced/hour/g catalyst following a one-half hour and a one hour period on oil, respectively. The total gas produced after one hour was 0.6 l. The coke on catalyst was 0.9 and 0.3 wt. % for the top and the bottom of the catalyst bed, respectively.

This example serves to demonstrate the minor improvement in the cat cracking activity realized for a TiO$_2$ on Al$_2$O$_3$ catalyst compared to Al$_2$O$_3$ of Example 1. See Table III A.

EXAMPLE 3

A 5.6 wt. % ZrO$_2$ on Al$_2$O$_3$ catalyst (containing 450 μm/g of Zr) was prepared using a methanol solution of ZrCl$_4$ sufficient to fill the pore volume of the alumina described in Example 1. The catalyst was then treated as described in Example 2. The cat cracking activity was obtained as described previously. The 5.6% ZrO$_2$ on Al$_2$O$_3$ catalyst had an activity of 0.03 cc 430—° F. liquid product/hour/g catalyst for both a one-half hour period and a one hour period on oil. The total gas production after one hour was 0.5.1. The coke on catalyst was 0.9 and 0.3 wt. % for the top and bottom of the catalyst bed, respectively.

This example again serves to demonstrate the minor improvement in the cat cracking activity realized for this catalyst compared to Al$_2$O$_3$ of Example 1 and very similar activity to the TiO$_2$ on Al$_2$O$_3$ catalyst of Example 2. See Table III B.

EXAMPLE 4

A 9.5 wt. % HfO$_2$ on Al$_2$O$_3$ catalyst (containing 450 μm/g of Hf) was prepared using a methanol solution of HfCl$_4$ sufficient to fill the pore volume of the alumina described in Example 1. The catalyst was then treated as described in Example 2. The cat cracking activity was obtained as described previously. The 9.5% Hf on Al$_2$O$_3$ catalyst had an activity of 0.01 and 0.02 cc 430−°F. liquid product/hour/g catalyst following a one-half hour and a one hour period on oil, respectively. The total gas produced after one hour was 0.2 l. The coke on catalyst was 0.8 and 0.5 wt. % for the top and the bottom of the catalyst bed, respectively.

This example again serves to demonstrate the minor improvement in the cat cracking activity realized for this catalyst compared to Al$_2$O$_3$. See Table III C.

EXAMPLE 5

A 4.0 wt. % V$_2$O$_5$ on Al$_2$O$_3$ catalyst (containing 450 μm/g of V) was prepared using a methanol solution of VOCl$_3$ sufficient to fill the pore volume of the alumina described in Example 1. The catalyst was then treated as described in Example 2. The cat cracking activity was obtained as described previously. The 4.0% V$_2$O$_5$ on Al$_2$O$_3$ catalyst had an activity of 0.23 and 0.12 cc 430−°F. liquid product/hour/g catalyst for both a one-half hour and a one hour period on oil. The total gas produced after one hour was 0.7 l. The coke on the catalyst was 2.1 and 1.6 wt. % for the top and bottom of the catalyst bed, respectively.

This example serves to demonstrate the major improvement in the cat cracking activity realized for this catalyst compared to the previous catalysts, Examples 1, 2, 3 and 4. This example also demonstrates that the activity realized is not associated with large coke deposits on the catalyst, e.g. 2.1 for this example compared to 1.6 of Example 1, respectively. Also, this example further demonstrates that the high activity of the catalyst of this example is realized with very similar gas production compared to the relatively inactive catalysts of the previous Examples 1, 2, 3 and 4. See Table III A.

EXAMPLE 6

A 6.0 wt. % Nb$_2$O$_5$ on Al$_2$O$_3$ catalyst (containing 450 μm/g of Nb) was prepared using a hexane solution of Nb(OC$_2$H$_5$)$_5$ sufficient to fill the pore volume of the alumina described in Example 1. The catalyst was then treated as described in Example 2. The cat cracking activity was obtained as described previously. The 6.0% Nb$_2$O$_5$ on Al$_2$O$_3$ catalyst had an activity of 0.59 and 0.45 cc 430−°F. liquid product/hour/g catalyst for both a one-half hour and a one hour period on oil, respectively. The total gas produced after one hour was 0.8 l. The coke on the catalyst was 1.5 wt. % for both the top and the bottom of the catalyst bed.

This example serves to demonstrate the major improvement in the cat cracking activity realized for this catalyst compared to the catalysts of Example 1, 2, 3 and 4. This example does indicate that the high activity obtained for this catalyst is about 2.5 times the activity obtained for $V_2O_5$ on $Al_2O_3$, Example 5. This example also demonstrates that the activity realized is not associated with large coke deposits on the catalyst, e.g. 1.5 compared to 1.6 for this example compared to Example 1, respectively. Also, this example further demonstrates that the high activity of the catalyst of this example is realized with very similar gas production compared to the relatively inactive catalysts of the previous Examples 1, 2, 3 and 4. See Table III B.

EXAMPLE 7

Another portion of the catalyst described in Example 6 was charged to a quartz tube, 1" in diameter, and placed in a tube furnace. The catalyst was steamed at 900° C. (1660° F.) with 20% $O_2$ in He sparged through water for 16 hours. The cat cracking activity was obtained as described previously. The steam treated 6% $Nb_2O_5$ on $Al_2O_3$ catalyst had an activity of 0.47 and 0.24 cc 430−°F. liquid product/hour/g catalyst for a one-half hour and a one hour period on oil, respectively. The total gas produced after one hour was 1.0 l. The coke on the catalyst was 2.5 and 2.3 wt. % for the top and the bottom of the catalyst bed, respectively.

This example serves to demonstrate the major improvement in the cat cracking activity realized for this catalyst compared to the previous catalysts, Examples 1, 2, 3 and 4. This example also demonstrates that the activity realized is not associated with large coke deposits on the catalyst, e.g. 2.5 for this example compared to 1.6 for Example 1, respectively. Most importantly this example demonstrates that high cat cracking activity is maintained even after severe steam treatment of the catalyst. Also, this example further demonstrates that the high activity of the catalyst of this example is realized with very similar gas production compared to the relatively inactive catalysts of the previous Examples 1, 2, 3 and 4. This example serves to demonstrate one of the most important results for the transition metal oxide acid catalysts of the instant invention, i.e. high temperature steam stability. See Table III B.

EXAMPLE 8

A 10.0 wt. % $Ta_2O_5$ on $Al_2O_3$ catalyst (containing 450 μm/g of Ta) was prepared using a heptane solution of $Ta(OC_2H_5)_5$ sufficient to fill the pore volume of the alumina described in Example 1. The catalyst was then treated as described in Example 2. The cat cracking activity was obtained as described previously. The 10.0% $Ta_2O_5$ on $Al_2O_3$ catalyst had an activity of 0.10 and 0.06 cc 430−°F. liquid product/hour/g catalyst for a one-half hour and a one hour period on oil, respectively. The total gas produced after one hour was 0.4 l. The coke on the catalyst was 1.0 and 1.1 wt. % for the top and the bottom of the catalyst bed, respectively.

This example serves to demonstrate that the cat cracking activity of a transition metal oxide supported on alumina is quite dependent on the transition metal ion chosen. Both $V_2O_5$ and $Nb_2O_5$, Examples 5 and 6, respectively are more active than the $Ta_2O_5$ catalyst of this example despite the fact that the transition metal concentration of all three catalysts was identical, i.e. 450 μm/g catalyst. This example, however, does serve to demonstrate higher cat cracking activity of the catalyst of this example compared to the previous catalysts of Examples 1, 2, 3 and 4. The Group VB metal oxides supported on alumina all exhibit greater cat cracking activity than the analogous Group IVB metal oxides supported on alumina. The most active Group VB oxide being niobium oxide, Example 6. See Table III C.

EXAMPLE 9

Because of the good cat cracking maintenance of the $Nb_2O_5$ on $Al_2O_3$ catalyst following severe steaming conditions, Example 7, another portion of the $Ta_2O_5$ alumina catalyst was treated under the conditions described in Example 7. The steam-treated 10% $Ta_2O_5$ on $Al_2O_3$ catalyst had an activity of 0.04 and 0.005 cc 430−°F. liquid product/hour/g catalyst for a one-half hour and a one hour period on oil, respectively. The total gas produced after one hour was 1.7 l. The coke on the catalyst was 6.1 and 8.4 wt. % for the top and the bottom of the catalyst bed, respectively.

This example demonstrates that a $Ta_2O_5$ on $Al_2O_3$ catalyst is not able to maintain cat cracking activity for high temperature steaming conditions unlike that observed for a $Nb_2O_5$ on $Al_2O_3$ catalyst, Example 7. This example also demonstrates a major problem with coke production for this steamed catalyst compared to the catalyst of Example 7. See Table III C.

EXAMPLE 10

Because of the wide usage of $Cr_2O_3$ on $Al_2O_3$ catalysts in heterogeneous catalysis, two different preparations were investigated. Both an aqueous and a non-aqueous preparation was made for comparison. A 4.5 wt. % $Cr_2O_3$ on $Al_2O_3$ catalyst (containing 450 μm/g of Cr) was prepared using an aqueous solution of chromic acid sufficient to fill the pore volume of the alumina described in Example 1. This catalyst will be referred to as Catalyst A. Another 4.5 wt. % $Cr_2O_3$ on $Al_2O_3$ catalyst was prepared using a methanol solution of $CrO_2Cl_2$ sufficient to fill the pore volume of the alumina described in Example 1. This catalyst will be referred to as Catalyst B. Catalysts A and B were both treated as described in Example 2. The cat cracking activity was obtained as described previously. Catalyst A had an activity of 0.06 and 0.03 cc 430−°F. liquid product/hour/g catalyst for a one-half hour and a one hour period on oil, respectively. The total gas produced after one hour was 0.7 l. The coke on the catalyst was 3.4 and 1.9 wt. % for the top and the bottom of the catalyst bed, respectively.

Catalyst B had an activity of 0.01 and 0.05 cc 430−°F. liquid product/hour/g catalyst for a one-half hour and a one hour period on oil, respectively. The total gas produced after one hour was 0.7 l. The coke on the catalyst was 2.0 and 1.7 for the top and the bottom of the catalyst bed, respectively.

This example serves to demonstrate the rather low cat cracking activity for both Catalyst A and B of this example. The superior activity of Catalyst A results in a higher coke make than for Catalyst B. This example further serves to demonstrate that the cat cracking activity of a transition metal oxide supported on alumina is quite dependent on the transition metal ion chosen. See Table III A.

EXAMPLE 11

A 6.9% $MoO_3$ on $Al_2O_3$ catalyst (containing 450 μm/g Ta) was prepared using an aqueous solution of ammonium molybdate sufficient to fill the pore volume of the alumina described in Example 1. The catalyst was then treated as described in Example 2. The cat cracking activity was obtained as described previously. The 6.9% $MoO_3$ on $Al_2O_3$ catalyst had an activity of 0.26 and 0.04 cc 430−°F. liquid product/hour/g catalyst for a one-half hour and a one hour period on oil, respectively. The total gas produced after one hour was 4.2 l. The coke on catalyst was 15.5 and 12.9 wt. %. for the top and the bottom of the catalyst bed, respectively.

This example has many important points to be made in comparison to the results of the other examples of the instant invention. Firstly, it should especially be noted that the gas make and coke deposits of this catalyst are much higher than for any of the catalysts of the previous examples. Secondly, note the marked decrease in the catalytic activity for the one hour compared to the one-half hour run length. This decrease in activity results in an activity only 14% of that for the shorter sample period. In contrast, the $Nb_2O_5$ on $Al_2O_3$ catalyst of Example 6 maintained 76% of activity of the shorter sample period. Clearly, the $MoO_3$ on $Al_2O_3$ catalyst would result in a cat cracking catalyst with very poor characteristics: high gas production, large coke production and rapid catalyst deactivation. This example further serves to demonstrate that the cat cracking activity of a transition metal oxide supported on alumina is quite dependent on the transition metal chosen. Note, also, the quite different results of the $MoO_3$ on $Al_2O_3$ catalyst compared to $Cr_2O_3$ on $Al_2O_3$ catalysts of Example 10. See Table III B.

EXAMPLE 12

A 10% $WO_3$ on $Al_2O_3$ catalyst (containing 430 μm/g of W) was prepared using an aqueous solution of ammonium tungstate sufficient to fill the pore volume of the alumina described in Example 1. The catalyst was then treated as described in Example 2. The cat cracking activity was obtained as described previously. The 10% $WO_3$ on $Al_2O_3$ catalyst had an activity of 0.79 and 0.68 cc 430−°F. liquid product/hour/g catalyst for a one-half hour and a one hour period on oil, respectively. The total gas produced after one hour was 2.2 l. The coke on catalyst was 4.3 and 6.0 wt. % for the top and the bottom of the catalyst bed, respectively.

This example has many important points to be made in comparison to the results of the other examples of the instant invention. Firstly, it should especially be noted that this is the most active catalyst of all those in the previous examples but with relatively low gas production, e.g. 2.2 for $WO_3$ on $Al_2O_3$ compared to 4.2 for $MoO_3$ on $Al_2O_3$, Example 11. Secondly, the catalytic activity remains quite high for the one hour reaction period despite the relative high coke production on the catalyst. This is evidence for $WO_3$ on $Al_2O_3$ tolerating high coke deposits while maintaining high catalytic activity. High coke tolerance for an acid catalyst would be a much desired feature for a heavy resid cat cracking process. See Table III C.

EXAMPLE 13

Another portion of the catalyst of Example 12 was steam treated at 900° C. as described in Example 7. The cat cracking activity was obtained as described previously. The steam-treated 10% $WO_3$ on $Al_2O_3$ catalyst had an activity of 0.68 and 0.58 cc 430−°F. liquid product/hour/g catalyst for a one-half hour and a one hour period on oil, respectively. The total gas produced was 2.3 l. The coke on the catalyst was 6.0 and 4.1 wt. % for the top and the bottom of the catalyst bed, respectively.

This example serves to demonstrate that the $WO_3$ on $Al_2O_3$ catalyst steamed at 900° C. is not greatly decreased in activity compared to the unsteamed catalyst of Example 12. This example collaborates the results obtained for the $Nb_2O_5$ on $Al_2O_3$ catalyst of Example 7. This example constitutes one of the most important results for the transition metal oxide acid catalysts of the instant invention, i.e. high temperature steam stability. See Table III C.

EXAMPLE 14

A 10.9 wt. % $Re_2O_7$ on $Al_2O_3$ catalyst (containing 450 μm/g of Re) was prepared using an aqueous solution of perrhenic acid sufficient to fill the volume of the alumina described in Example 1. The catalyst was then treated as described in Example 2. The cat cracking activity was obtained as described previously. The 10.9% $Re_2O_7$ on $Al_2O_3$ catalyst had an activity of 0.06 and 0.04 cc 430−°F. liquid product/hour/g catalyst for a one-half hour and a one hour period on oil, respectively. The total gas produced after one hour was 6.8 l. The coke on catalyst was 23.4 and 21.9 for the top and the bottom of the catalyst bed, respectively.

This example has many important points to be made in comparison to the results of the other examples of the instant invention. Firstly, this example emphasizes the completely different cat cracking results in changing in the third row of the periodic table from W to Re. The gas make and coke on catalyst of the $Re_2O_7$ on $Al_2O_3$ catalyst would make the catalyst completely unsuitable as a catalyst because the valuable liquid product would be converted to a large degree to gases and coke. Secondly, the cracking activity of this catalyst is quite low in comparison to the $WO_3$ on $Al_2O_3$ catalyst of Example 12. This example further serves to demonstrate that the cat cracking activity of a transition metal oxide supported on alumina is quite dependent on the transition metal chosen. See Table III C.

TABLE III A

| FIRST ROW ELEMENTS OF GROUP IV, V, VIB | | | | |
|---|---|---|---|---|
| Catalyst | Conversion at 0.5 hr | Conversion at 1 hr. | Gas Make (L) | % C on Cat Top/ Bottom |
| 3.6% $TiO_2$ on $Al_2O_3$ | 0.9 | 0.7 | 0.6 | 1/1.4 |
| 4% $V_2O_5$ on $Al_2O_3$ | 4.9 | 2.7 | 0.7 | 2.1/1.6 |
| 4.5% $Cr_2O_3$ on $Al_2O_3$ (Aq. Prep) | 1.2 | 0.6 | 0.7 | 3.4/1.9 |
| 4.5% $Cr_2O_3$ on $Al_2O_3$ (Non-Aq. Prep) | 0.2 | 1.1 | 0.7 | 2.0/1.7 |
| $Al_2O_3$ Blank | 0.1 | 0.2 | 0.4 | 1.6/0.7 |

It is clear from the data in the above Table that vanadium oxide is the only first row transition metal oxide with appreciable activity. This activity is still a factor of three lower than for 10% $WO_3$ on $Al_2O_3$, however.

TABLE III B

| SECOND ROW ELEMENTS OF GROUP IV, V AND VIB | | | | |
|---|---|---|---|---|
| Catalyst | Conversion at 0.5 Hr. | Conversion at 1 Hr. | Gas Make (L) | % C on Cat Top/ Bottom |
| 5.6% $ZrO_2$ on $Al_2O_3$ | 0.7 | 0.7 | 0.5 | 9/.3 |
| 6% $Nb_2O_5$ on $Al_2O_3$ | 12.9 | 9.8 | 0.8 | 1.5/1.5 |
| 6% $Nb_2O_5$ on $Al_2O_3$ (Steamed at 900° C.) | 10.3 | 5.2 | 1.0 | 2.5/2.3 |
| 6.9% $MoO_3$ on $Al_2O_3$ | 5.7 | 0.8 | 4.2 | 15.5/12.9 |
| $Al_2O_3$ Blank | 0.1 | 0.2 | 0.4 | 1.6/0.7 |

The data in the above table is very significant. The cracking activity of $Nb_2O_5$ on $Al_2O_3$ is very high, only ca. 25% less than 10% $WO_3$ on $Al_2O_3$. However, the gas make and coke on catalyst are both less than $WO_3$ on $Al_2O_3$. Also, the above $Nb_2O_5$ on $Al_2O_3$ catalyst shows good steam stability as found for $WO_3$ on $Al_2O_3$. This is a very promising catalyst discovery. Note also the much greater activity of $Nb_2O_5$ catalyst compared to the other second row elements. Particularly, note the huge coke production of the $MoO_3$ catalyst.

TABLE III C

THIRD ROW ELEMENTS OF GROUP IV, V, VI, VIIB

| Catalyst | Conversion at 0.5 Hr. | Conversion at 1 Hr. | Gas Make (L) | % C on Cat Top/ Bottom |
|---|---|---|---|---|
| 9.5% $HfO_2$ on $Al_2O_3$ | 0.3 | 0.4 | 0.2 | 0.8/0.5 |
| 10% $Ta_2O_5$ on $Al_2O_3$ | 2.1 | 1.4 | 0.4 | 1/1.1 |
| 10% $Ta_2O_5$ on $Al_2O_3$ (Steamed) | 0.9 | 0.1 | 1.7 | 6.1/8.4 |
| 10% $WO_3$ on $Al_2O_3$ | 17.1 | 14.9 | 2.2 | 4.3/6.0 |
| 10% $WO_3$ on $Al_2O_3$ (Steamed) | 14.8 | 12.5 | 2.3 | 6.0/4.1 |
| 10% $WO_3$ on $SiO_2$ (P.P.G. Beads, Non-Aq. Prep.) | 1.3 | 0 | 0.5 | |
| 10% $WO_3$ on 15.4 $SiO_2$ $Al_2O_3$ | 10.3 | 2.2 | | |
| 10.9% $Re_2O_7$ on $Al_2O_3$ | 1.2 | 0.8 | 6.8 | 23.4/21.9 |
| $Al_2O_3$ Blank | 0.1 | 0.2 | 0.4 | 1.6/0.7 |

The above data demonstrates that the $WO_3$ on $Al_2O_3$ catalyst is far superior to any of the third row metals of Group IV, V, VI and VIIB. Also, the $WO_3$ on $Al_2O_3$ catalyst is steam stable as evidenced by the steamed catalyst having 85% of the fresh catalyst activity.

EXAMPLE 15

An alumina ($\gamma$-$Al_2O_3$) extrudate available commercially (Engelhard Industries) was evaluated for cat cracking activity under conditions described above. At these conditions after 1 hour on oil, the $Al_2O_3$ catalyst had an activity of 0.01 cc 430$-^\circ$F. liquid produced/hour/g cat. The total gas production after 1 hour was 0.4 liter. This example is for comparison to other catalysts of the instant invention.

EXAMPLE 16

A 2% $WO_3$ on $Al_2O_3$ catalyst was prepared by standard impregnation techniques using an aqueous solution of ammonium metatungstate (AMT) onto the alumina extrudate described in Example 15. Following drying at 110° C. overnight this catalyst was calcined at 500° C. for 16 hours and then evaluated for cat cracking activity under identical conditions to those described previously. At these conditions the activity for 430$-^\circ$F. liquid production is 0.40 cc 430$-^\circ$F. liquid produced/hr/g cat. The gas production after 1 hour was 0.5 liter. This example is for comparison to other catalysts of the current invention. This example also illustrates the much higher activity for cat cracking of 2% $WO_3$ on $Al_2O_3$ catalyst compared to the pure $Al_2O_3$ support described in Example 15.

EXAMPLE 17

A portion of the 2% $WO_3$ on $Al_2O_3$ catalyst described in Example 16 was steam treated at 900° C. for 16 hours in air sparged through water. After steaming, a portion of the catalyst was evaluated for activity for cat cracking of gas oil under conditions identical to those described previously. At these conditions the activity for 430$-^\circ$F. liquid production is 0.22 cc 430$-^\circ$F./hr/g cat. The gas production after 1 hour was 0.5 liter. This example serves to demonstrate the superior catalytic activity of this high temperature steamed catalyst compared to alumina itself, Example 15. This catalyst also demonstrates that about one-half the catalytic activity has been maintained following the above high temperature steam treatment compared to the unsteamed catalyst of Example 16. This example is also of value when compared to other tungsten oxide catalysts of the instant invention.

EXAMPLE 18

A 4% $WO_3$ on $Al_2O_3$ catalyst was prepared by standard impregnation techniques using an aqueous solution of ammonium metatungstate onto the alumina extrudate described in Example 15. This catalyst was calcined in air at 500° C. for 16 hours and then evaluated for cat cracking activity under conditions identical to those described previously. At these conditions the activity for 430$-^\circ$F. liquid production is 0.40 cc 430$-^\circ$F. liq/hr/g cat. The total gas make after 1 hour is 0.7 liter. This example is useful for comparison to the steamed catalyst of Example 19. The catalytic activity of this example is quite close to the activity obtained for the catayst of Example 16 despite the factor of two differences in the tungsten oxide content of this catalyst.

EXAMPLE 19

A portion of 4% $WO_3$ on $Al_2O_3$ catalyst described in Example 18 was subjected to a steaming treatment for 16 hours at a temperature of 900° C. After this treatment the cat cracking activity for 430$-^\circ$F. liquid production was 0.53 cc 430$-^\circ$F. liq/hr/g cat. The total gas production after 1 hour was 0.9 liter.

This example demonstrates a unique feature of the $WO_3$ on $Al_2O_3$ catalysts of the instant invention. The catalytic activity of this high temperature steamed catalyst is increased over the unsteamed catalyst, Example 18. In addition, the activity of this steamed 4% $WO_3$ on $Al_2O_3$ catalyst is much greater than the activity of the steamed 25 $WO_3$ on $Al_2O_3$catalyst of Example 17. This example thereby demonstrates the critical dependence of tungsten oxide content on catalytic activity following severe steaming conditions.

EXAMPLE 20

A 6% $WO_3$ on $Al_2O_3$ catalyst was prepared by impregnation of an aqueous solution of ammonium metatungstate onto the alumina extrudate described in Example 15. This catalyst was then calcined in air for 16 hours at 500° C. and then evaluated for cat cracking activity under conditions previously described. At these conditions, the activity for 430$-^\circ$ F. liquid production is 0.69 cc 430$-^\circ$ liq/hr/g cat. The total gas make after 1 hour is 1.8 liter. This example demonstrates the superior activity of a 6% $WO_3$ on $Al_2O_3$ to either the 4% $WO_3$ on $Al_2O_3$ catalyst, Example 18, or the 2% $WO_3$ on $Al_2O_3$ catalyst, Example 16. This example further demonstrates the critical dependence on tungsten oxide content of catalytic activity. This example is useful for comparison to Example 21.

EXAMPLE 21

A portion of the 6% $WO_3$ on $Al_2O_3$ catalyst described in Example 20 was subjected to a steaming treatment for 16 hours at 900° C. After this treatment the cat cracking activity for 430$-^\circ$ F. liquid production was 1.00 cc 430$-^\circ$ F. liq/hr/g cat. The total gas make after 1 hour on stream was 1.8 liter. This example illustrates the superior activity of the steamed 6% $WO_3$ on $Al_2O_3$ catalyst compared to the unsteamed 6% $WO_3$ on $Al_2O_3$ catalyst described in Example 20. This example demonstrates a unique feature of $WO_3$ on $Al_2O_3$ catalysts of the instant invention. The catalytic activity of this high temperature steamed catalyst is increased over that of the unsteamed catalyst of Example 20. In addition, the activity of the steamed catalyst is higher than the steamed and unsteamed 4% $WO_3/Al_2O_3$ catalysts of Examples 18 and 19 and also higher than the activities of the steamed and unsteamed 2% $WO_3/Al_2O_3$ catalysts of Examples 16 and 17. This demonstrates the critical dependence of $WO_3$ content on catalytic activity following severe steaming treatment.

EXAMPLE 22

An 8% $WO_3/Al_2O_3$ catalyst was prepared by impregnating an aqueous solution of ammonium metatungstate onto the alumina extrudate described in Example 15. This catalyst was calcined for 16 hours at 500° C. and then evaluated for cat cracking activity under conditions identical to those described previouly. At these conditions, the activity for 430$-$° F. liquid production is 0.73 cc 430$-$° F. liq/hr/g cat. The total gas make after 1 hour is 2.0 liter. This example is useful for comparison to the steamed catalyst of Example 23.

EXAMPLE 23

A portion of the 8% $WO_3$ on $Al_2O_3$ catalyst described in Example 22 was subjected to a steaming treatment for 16 hours at 900° C. After this treatment, the cat cracking activity for 430$-$° F. liquid production was 0.81 cc 430$-$° F./hr/g cat. The total gas make after 1 hour on stream was 2.0 liter. This example demonstrates a unique feature of the $WO_3/Al_2O_3$ catalysts of the current invention. The catalytic activity of this high temperature steamed catalyst is increased over the unsteamed catalyst, Example 22. In addition the activity of this steamed catalyst is more active than the steamed 2% $WO_3$ on $Al_2O_3$ and 4% $WO_3$ and $Al_2O_3$ catalysts of Examples 17 and 19, respectively. However, the activity of this steamed catalyst is lower in activity compared to the steamed 6% $WO_3$ on $Al_2O_3$ catalyst of Example 21. This example further demonstrates the critical dependence of tungsten oxide content on catalytic activity following severe steaming treatments.

EXAMPLE 24

A 10% $WO_3/Al_2O_3$ catalyst was prepared by impregnating an aqueous solution of ammonium metatungstate onto the alumina extrudate described in Example 15. This catalyst was calcined in air at 500° C. for 16 hours and then evaluated for cat cracking activity under conditions identical to those described previously. At these conditions the activity for 430$-$° F. liquid production of 0.95 cc 430$-$° F./hr/g cat. The total gas make after 1 hour on stream is 2.2 liter. This example is useful for comparison to Example 25. This example also demonstrates a higher activity compared to other unsteamed $WO_3/Al_2O_3$ catalysts of lower $WO_3$ concentrations.

EXAMPLE 25

A portion of the 10% $WO_3/Al_2O_3$ catalyst described in Example 24 was subjected to a steaming treatment at 900° C. for 16 hours. After this treatment, the cat cracking activity for 430$-$° F. liquid production was 0.80 cc 430$-$° F./hr/g cat. The total gas make after 1 hour on stream was 2.3 liter. This example demonstrates the unique feature of good high temperature stability of $WO_3/Al_2O_3$ catalysts of the instant invention.

EXAMPLE 26

A 25% $WO_3$ on $Al_2O_3$ catalyst was prepared by impregnating an aqueous solution of ammonium metatungstate onto an alumina extrudate identical to and described in Example 15. This catalyst was calcined in air at 500° C. for 16 hours and then evaluated for cat cracking activity under conditions identical to those described previously. At these conditions the activity for 430$-$° F. liquid production is 0.49 cc liq/hr/g cat. The total gas make after 1 hour on stream is 4.6 liter. This example is useful for comparison to catalysts of the instant invention. This example demonstrates little advantage of increased $WO_3$ content much above the 10% $WO_3$ content described in Example 24.

EXAMPLE 27

An amorphous silica-alumina catalyst (13% $Al_2O_3$) that had been air calcined at 540° C. for 16 hours was evaluated for cat cracking activity under conditions identical to those described above. Under these conditions, the activity for 430$-$° F. liquid production was 0.83 cc 430$-$° F. liq/hr/g cat. The total gas make after 1 hour on stream was 2.8 liter. This example is useful for comparison to catalysts of the current invention. Fresh $SiO_2.Al_2O_3$ has activity comparable to 8% $WO_3$ on $Al_2O_3$ (Example 22) and 10% $WO_3$ on $Al_2O_3$ (Example 24). This example is also useful for comparison to Examples 28 and 29.

EXAMPLE 28

A portion of the $SiO_2.Al_2O_3$ catalyst described in Example 27 was steamed for 16 hours at 760° C. The activity of this catalyst was 0.72 cc 430$-$° F. liq/hr/g cat. The total gas make after 1 hour was 0.7 liter. This example is useful for comparison to Examples 32 and 33 and to catalysts of the current invention. A steaming treatment at 760° C. has only a modest effect on activity compared to the activity of a fresh $SiO_2Al_2O_3$ catalyst (Example 27). This catalyst is comparable in activity to $WO_3$ on $Al_2O_3$ catalysts, both fresh and steamed, described in Examples 20 to 25.

EXAMPLE 29

A portion of the $SiO_2.Al_2O_3$ catalyst described in Example 27 was steam treated for 16 hours at 900° C. The activity of this catalyst was 0.32 cc 430$-$° F. liq/hr/g cat. The total gas make after 1 hour on stream was 0.8 liter. This example is useful for comparison to Example 27 and 28 and to catalysts of the instant invention. The $SiO_2.Al_2O_3$ catalyst steamed at 900° C. has lost substantial activity compared to fresh $SiO_2.Al_2O_3$ catalysts (Example 27) and to $SiO_2.Al_2O_3$ catalyst steamed at lower temperature (Example 28). This example also serves to show that commercially available $SiO_2.Al_2O_3$ cat cracking catalysts have substantially lower thermal stability in the presence of steam compared to catalysts of the current invention (see examples 19 to 25).

EXAMPLE 30

A commercial zeolite cracking catalyst consisting of 8.5% zeolite in an amorphous $SiO_2.Al_2O_3$ matrix was calcined at 540° C. for 16 hours under conditions identical to those described above. The catalyst had an activity for 430⁻ liquid production of 1.35 cc 430⁻/hr/g cat. Total gas make after 1 hour was 3.3 liter. This example is useful for comparison to Examples 31 and 32 and to catalysts of the current invention. This example demonstrates that a typical fresh zeolite cat cracking catalyst has activity somewhat higher than catalysts of the current invention. For example, the activity of this catalyst is 1.42 times more active than the 10% $WO_3$ on $Al_2O_3$ catalyst described in Example 24.

EXAMPLE 31

A portion of the catalyst described in Example 30 was steam treated at 760° C. for 16 hours. This catalyst had an activity of 1.42 cc 430⁻° F./hr/g cat. The total gas make after 1 hour on stream was 2.9 liter. This example is useful for comparison to Examples 30 and 32 and to catalysts of the current invention. A steaming treatment at 760° C. has a slight beneficial effect on the activity of this catalyst compared to a fresh calcined catalyst described in Example 30. The activity of this catalyst is somewhat higher than catalysts of the current invention.

EXAMPLE 32

A portion of the catalyst described in Example 30 was steam treated at 900° C. for 16 hours. This catalyst had an activity of 0.10 cc 430⁻° F./hr/g cat. Total gas make after 1 hour on stream was 0.9 liter. This example is useful for comparison to Examples 30 and 31 and to catalysts of the current invention. The activity of the zeolite cracking catalyst following a severe steaming treatment at 900° C. declines more than on order of magnitude compared to the activity of a fresh zeolite catalyst (Example 30) or a zeolite catalyst steamed at lower temperatures (Example 31). This example also serves to show the much superior thermal stability of the catalyst of the current invention compared to a state of the art commercial cat cracking catalyst. See for example the effect of steaming on the activity of catalysts in Examples 19 to 25.

Steam Stability of $WO_3$ on $Al_2O_3$ vs Zeolite or $SiO_2.Al_2O_3$

In the previous discussion on the Group IV, V, VI and VIIB metal oxides as cracking catalysts the conditions employed to test the catalysts were reported. Therefore, they will not be repeated here. Below is the data obtained by comparing the $WO_3$ on $Al_2O_3$ catalyst to $SiO_2.Al_2O_3$ as well as a commercial zeolite cat cracking catalyst. Each catalyst was investigated fresh, steamed at 1400° F. and also at 1600° F. The steam stability at 1600° F. is a crucial requirement for steam gasification of the carbon deposits on the catalyst which might be a requirement for a resid cat cracking process.

TABLE IV

| Catalyst | Conversion at 0.5 Hr. | Conversion at 1 Hr. | Gas Make (1) | % C on Cat Top/ Bottom |
|---|---|---|---|---|
| 10% $WO_3$ on $Al_2O_3$ (Fresh) | 22.5 | 13.5 | 2.1 | 5.2/5.2 |
| 10% $WO_3$ on $Al_2O_3$ (Repeat Preparation Fresh) | 17.1 | 14.9 | 2.2 | 4.3/6.0 |
| 10% $WO_3$ on $Al_2O_3$ (Steamed 900° C.) | 14.8 | 12.5 | 2.3 | 6.0/4.1 |
| Zeolite Catalyst Fresh | 20.7 | 21.1 | 3.3 | 3.4/4.2 |
| Zeolite Catalyst (Steamed 760° C.-1400° F.) | 38.8 | 22.2 | 2.9 | 2.1/3.4 |
| Zeolite Catalyst (Steamed 900° C.-1660° F.) | 4.0 | 1.6 | 0.9 | 1.5/1.4 |
| Silica-Alumina (14% $Al_2O_3$) Fresh | 11.8 | 12.9 | 2.8 | 4.3/5.2 |
| Silica-Alumina (Steamed 760° C. 1400° F.) | 19.2 | 11.3 | 0.7 | 2.5/2.1 |
| Silica-Alumina (Steamed 900° C.-1660° F.) | 5.8 | 5.0 | 0.8 | 2.1/1.8 |

The zeolite and silica-alumina catalysts steamed at 1650° F. are much less active than the steam stable $WO_3$ on $Al_2O_3$ catalyst. Also, the activity of the fresh $WO_3$ on $Al_2O_3$ catalyst compares favorably after a one-hour run period with either fresh zeolite or fresh silica-alumina catalyst.

It has also been demonstrated that a marked difference in catalyst activity between the $WO_3$ on $Al_2O_3$ catalyst calcined in steam at 900° C. and the same weight loading of tungsten oxide impregnated onto pre-steamed alumina. Consider the table below. All catalysts were at the 4 wt.% $WO_3$ level.

TABLE V

| Catalyst | Conversion at 0.5 Hr. | Conversion at 1 Hr. | Gas Make (1) | % C on Cat Top/ Bottom |
|---|---|---|---|---|
| 4% $WO_3$ (Fresh) | 8.9 | 6.2 | 0.7 | 0.9/1.0 |
| Above Cat Steamed at 900° C. | 11.3 | 8.3 | 0.9 | 2.4/2.2 |
| Steamed $Al_2O_3$ followed by identical prep. as for 4% $WO_3$ catalyst above (Fresh) | 9.7 | 2.8 | 0.6 | 2.0/2.7 |

Note the large drop in catalyst activity following one hour reaction period.

EXAMPLE 33

The preparation of high surface area $\alpha$-$Al_2O_3$ from $\gamma$-$Al_2O_3$ (190 m²/g) in extrudate form where a carbon char was formed in the pores of the extrudate was achieved by the following procedure. A standard sugar solution was prepared by dissolving 250 g of sucrose in 100 milliliters of distilled water heated to 140° F. A 50 milliliter portion of this saturated solution was contacted with 100 g of $\gamma$-alumina extrudates of reforming grade purity (Engelhard Industries, Inc.) This amount of the sugar solution was just that amount which would fill the pore volume of the extrudates. Therefore, this procedure constitutes a quasi-incipient wetness impregnation. The entire amount of material was then dried at 120° C. for 16 hrs. Following this overnight drying step the weight of the extrudates plus the weight of sugar in the pores was 135 g. Therefore, a 35% weight increase occurred due to the sugar impregnation step. The above preparation was then divided into two equal portions. Each portion was then treated in a tube furnace for 16 hrs. under a blanket of flowing helium to "char" the sugar in the pores of the alumina extrudate. Large quantities of water were removed in this heat treatment step.

The weight percent carbon found on a sample from each bath treated at 600° C. was in good agreement, 7.0 and 7.2 wt. % carbon. These two batches were then combined and used in a series of experiments reported in other Examples.

EXAMPLE 34

A few gram portion of the carbonized-alumina of Example 33 was heated in a tube furnace at 1100° C. in a reducing atmosphere of 15% $H_2$ in Argon to insure that the carbon would not be removed by oxidation. The objective of this heat treatment was to convert the $\gamma$-alumina phase to an $\alpha$-alumina phase while maintaining high surface area. The sample was kept at this temperature for 16 hrs. The sample was then removed from the tube furnace at ambient temperature. To remove the carbon from the pores of the alumina the sample was treated in a tube furnace at 680° C. in flowing 20% oxygen in helium at a flow rate of 500 cc/minute for 16 hrs. The X-ray diffraction pattern for a powder sample indicated a mixture of alumina phases to be present for the 1100° C. heat treatment. Both $\gamma$- and $\alpha$-$Al_2O_3$ phases were present. This example serves to demonstrate that partial conversion of the $\gamma$-alumina occurs at 1100° C. for a portion of the sample of Example 33 with 7% carbon in the pores of the extrudate. The surface area of this extrudate was 80.3 $m^2/g$.

EXAMPLE 35

A few grams of the carbonized-alumina of Example 33 was treated as described in Example 34 except that the high temperature treatment was increased to 1150° C. Treatment at 1150° C. resulted in complete conversion of the $\gamma$ alumina phase to $\alpha$-alumina based on the X-ray diffraction pattern of this sample. The surface area of this sample was 37.6 $m^2/g$. This example serves to demonstrate the sensitivity of the $\gamma$-alumina to $\alpha$-alumina phase transformation as a function of temperature. The weight % carbon on this $\alpha$-$Al_2O_3$ sample was only 0.06 wt. % following the calcination step. This low carbon level indicates that a carbon-free $\alpha$-phase has been produced by the procedure described in Example 34.

EXAMPLE 36

A few grams of the carbonized-alumina of Example 33 was treated as described in Example 34 except that the high temperature heat treatment was increased to 1200° C. The X-ray diffraction pattern of this sample was quite similar to that of Example 35. This indicates, of course, that the 1150° C. treatment temperature was very near to the lower temperature limit which converts the alumina described in Example 1 to the $\alpha$-phase. The surface area of the $\alpha$-$Al_2O_3$ produced by the above 1200° C. calcination treatment was 21.3 $m^2/g$. This Example serves to demonstrate the advantages of a minimum temperature of heat treatment in maintaining a high surface area for the $\alpha$-alumina phase produced. The $\alpha$-alumina produced in Example 35 at 1150° C. has a surface area nearly double that of the material of this Example. This Example points to a very important function of temperature in controlling the final $\alpha$-alumina surface area. It is most important in many catalytic processes known to those skilled in the art to maintain the maximum surface area of the catalyst in as high as state as possible. This Example clearly shows the unexpected importance of small temperature differences in producing a material of maximum surface area.

EXAMPLE 37

Instead of using a few grams of the carbonized-alumina, 70 g of the material was heat treated at 1150° C. as in Example 35. However, instead of a calcination treatment at 700° C. to remove the carbon a calcination step at 892° C. for 16 hrs. in 20% $O_2$ in helium at 500 cc/min was used. As noted in Example 35, X-ray analysis of this sample showed complete conversion of $\gamma$-alumina to $\alpha$-alumina. Also, the surface area of this sample was found to be 43.2 $m^2/g$. This example serves to demonstrate two important points. Firstly, a high surface area $\alpha$-alumina in extrudate form can be prepared in a completely reproducible fashion as described in Example 35 by a 1150° C. heat treatment. Secondly, the $\alpha$-alumina produced in this example is stable to a 892° C. calcination treatment. Note that the calcination treatment is 200° C. higher than for the sample of Example 35 while having a slightly higher surface area. This remarkable stability of the $\alpha$-alumina phase to desurfacing under extreme temperature conditions is an unexpected finding not recognized in the prior art. Also, it is quite significant that the surface area of this sample is over twice that of the 1200° C. prepared sample of Example 36.

EXAMPLE 38

To 55 g of the $\alpha$-alumina in extrudate form of Example 37, 3.16 g of ammonium meta-tungstate containing 2.89 g $WO_3$ in 27.5 cc of water was added. This amount of liquid is just that which fill the pores of the extrudate. The sample was then dried for 16 hours at 120° C. and finally calcined overnight at 500° C. in a muffle furnace. The final catalyst contained 5 wt. % $WO_3$ on the $\alpha$-$Al_2O_3$ extrudate. An X-ray analysis of a powdered sample indicated the $WO_3$ phase to be in less than 4.0 nm diameter particles as no lines due to a $WO_3$ phase were observed. In order to determine if the $WO_3$ on $\alpha$-$Al_2O_3$ phase was acidic, a standard Benesi titration with n-butylamine was used. (K. Tanabe, "Solid Acids and Bases", Academic Press, N.Y. 1970, p. 14). The $\alpha$-alumina itself, Example 37, was shown to have no strong acid sites ($-8.2$ and $-5.6$ on the Ho Hammett activity scale). However, for the 5% $WO_3$ $\alpha$-alumina there were $37\pm12$ $\mu m/g$ of $-8.2$ strength acid centers. This example serves to demonstrate that introduction of $WO_3$ onto $\alpha$-alumina produces a solid acid with strong acid sites. This material of this Example was investigated for gas oil catalytic cracking and was shown to have significant catalytic activity (Example 39).

EXAMPLE 39

The catalyst of Example 38 was investigated for gas oil cracking activity as described in previous examples. The catalytic activity following a one-half hour period was 0.19 cc 430$-°$ F. liquid produced/hour/g catalyst. The total gas production after one hour was 0.6 l. The coke on catalyst was 1.3 and 1.3 wt. % for the top and the bottom of the catalyst bed, respectively. This example serves to demonstrate that $WO_3$ on $\alpha$-$Al_2O_3$ is an active cat cracking catalyst. The activity of $WO_3$ on $\alpha$-$Al_2O_3$ compared to $\gamma$-$Al_2O_3$ of Example 1 was a factor of 38 higher. The $\alpha$-$Al_2O_3$ of Example 37 itself would be less active than $\gamma$-$Al_2O_3$ as $\alpha$-$Al_2O_3$ was shown to have no strong acid sites (see discussion Example 38).

EXAMPLE 40

To 29.34 g of the α-alumina in extrudate form of Example 6, 0.657 g of ammonium meta-tunstate was added as described in Example 38. The above sample was dried and calcined as described in Example 38. The final catalyst contained 2 wt. % $WO_3$ on $\alpha\text{-}Al_2O_3$. Fifteen grams of the above sample was calcined for 16 hrs. at 900° C. in air sparged through water. The surface area of this sample following this severe steaming treatment was found to be 33.7 m²/g. This example serves to demonstrate the good surface area stability of $WO_3$-supported on the α-alumina of the present invention. Note that the surface area of the α-alumina of Example, 37, 43.2 m²/g is largely preserved for a sample containing $WO_3$ and following a severe steaming treatment.

What is claimed is:

1. A continuous process for the catalytic cracking of a hydrocarbon feedstream and the simultaneous generation of a low BTU gas or hydrogen-rich gas from coke which process involves:
   (1) contacting a hydrocarbon feedstream with an acid catalyst comprising a catalytic component selected from the group consisting of oxides of tungsten, niobium and mixtures thereof and tungsten or niobium oxides in combination with one or more additional metal oxides selected from the group consisting of tantalum oxide, hafnium oxide, chromium oxide, titanium oxide and zirconium oxide on an inorganic refractory oxide support selected from the group consisting of α-alumina η-alumina, γ-alumina, zirconia, boria, thoria, magnesia, zirconium-titanate, titania, chromia, kieselguhr and mixtures thereof, said catalyst being steamed prior to use, at a temperature, pressure and for a time sufficient to effect the desired catalytic change on the hydrocarbon feedstream and yield a coked catalyst;
   (2) regenerating the coked catalyst at regenerating conditions by contacting same with steam, oxygen-containing gas or mixture thereof to produce a regenerated catalyst and an $H_2$ rich gas, a low BTU gas rich in CO and a combination thereof; and
   (3) recirculating the regenerated catalyst of step (2) to the hydrocarbon conversion zone of step (1).

2. The process of claim 1 wherein the catalytic component is selected from the group consisting of tungsten oxide, niobium oxide and mixtures thereof.

3. The process of claim 2 wherein the catalytic component metal oxide is tungsten oxide.

4. The process of claim 1 wherein the catalyst further comprises a promoter selected from the group consisting of barium oxide, calcium oxide, stontium oxide and cesium oxide present in an amount ranging from 0.01 to 4.0 wt. % based on total catalyst weight.

5. The process of claim 3 wherein the refractory oxide support is selected from the group consisting of the aluminas.

6. The process of claim 1 wherein the hydrocarbon feedstream is a 1050° F.+ hydrocarbon feedstream.

7. The process of claim 1 wherein the contacting of the hydrocarbon feedstream with the catalyst in step (1) is conducted at a temperature of from 300° to 900° C., a pressure of from 0 to 10,000 PSIG, contact time ranging from 1 to 2000 seconds at from 0.1 to 50 weight feed/hour/weight catalyst.

8. The process of claim 1 wherein step (1) further comprises the use of water at a water to hydrocarbon mole ratio ranging from 0.5:1 to 20:1.

9. The process of claim 7 wherein the regeneration conditions of step (2) comprise a temperature of from about 1400°–2800° F. and an oxidative atmosphere.

10. The process of claim 7 wherein the regeneration conditions of step (2) comprise a temperature of from about 1400°–2800° F. and a steam atmosphere.

11. The process of claim 1 wherein the catalyst comprises from 0.1 to 25 wt. % of the catalytic component based on total catalyst weight.

12. The process of claim 9, 10 or 11 wherein the catalyst is niobium oxide supported on alumina.

13. The process of claim 9, 10 or 11 wherein the catalyst is tungsten oxide supported on alumina.

* * * * *